(12) United States Patent
Hayashi et al.

(10) Patent No.: US 7,920,455 B2
(45) Date of Patent: Apr. 5, 2011

(54) COMPLEX OPTICAL ELEMENT AND OPTICAL PICKUP

(75) Inventors: Katsuhiko Hayashi, Osaka (JP); Jun Murata, Osaka (JP); Yasuhiro Tanaka, Hyogo (JP); Michihiro Yamagata, Osaka (JP)

(73) Assignee: Panasonic Corporation, Osaka (JP)

( * ) Notice: Subject to any disclaimer, the term of this patent is extended or adjusted under 35 U.S.C. 154(b) by 540 days.

(21) Appl. No.: 11/889,674

(22) Filed: Aug. 15, 2007

(65) Prior Publication Data

US 2008/0049587 A1   Feb. 28, 2008

Related U.S. Application Data

(60) Provisional application No. 60/878,403, filed on Jan. 4, 2007.

(30) Foreign Application Priority Data

Aug. 23, 2006   (JP) .................................. 2006-226241

(51) Int. Cl.
G11B 7/00 (2006.01)

(52) U.S. Cl. .............................. 369/112.08; 369/112.26

(58) Field of Classification Search .............. 369/112.08
See application file for complete search history.

(56) References Cited

U.S. PATENT DOCUMENTS

| | | | |
|---|---|---|---|
| 6,781,944 B1* | 8/2004 | Tanaka ...................... | 369/112.12 |
| 6,947,368 B2* | 9/2005 | Hendriks et al. ......... | 369/112.26 |
| 7,206,276 B2 | 4/2007 | Kimura et al. | |
| 7,382,709 B2 | 6/2008 | Kimura et al. | |
| 7,483,358 B2 | 1/2009 | Kimura et al. | |
| 2002/0012175 A1* | 1/2002 | Katsuma ...................... | 359/719 |
| 2002/0054558 A1* | 5/2002 | Freeman .................. | 369/112.07 |
| 2003/0185134 A1 | 10/2003 | Kimura et al. | |
| 2003/0235137 A1* | 12/2003 | Nishioka et al. ......... | 369/112.05 |
| 2005/0041560 A1* | 2/2005 | Katsuma et al. ......... | 369/112.08 |
| 2005/0141392 A1* | 6/2005 | Kitahara et al. ......... | 369/112.05 |
| 2005/0226124 A1* | 10/2005 | Kimura et al. ............ | 369/112.08 |
| 2005/0265151 A1 | 12/2005 | Kimura et al. | |
| 2006/0092816 A1* | 5/2006 | Kimura .................... | 369/112.08 |
| 2007/0104071 A1* | 5/2007 | Asoma ..................... | 369/112.05 |
| 2007/0258144 A1 | 11/2007 | Kimura et al. | |
| 2008/0181085 A1 | 7/2008 | Kimura et al. | |
| 2009/0080321 A1 | 3/2009 | Kimura et al. | |

FOREIGN PATENT DOCUMENTS

| | | |
|---|---|---|
| CN | 1412591 A | 4/2003 |
| JP | 2000-090471 | 3/2000 |
| JP | 2005-190620 | 7/2005 |
| JP | 2006-12394 | 1/2006 |
| JP | 2006-031901 A | 2/2006 |

OTHER PUBLICATIONS

Chinese Office Action issued in Chinese Patent Application No. CN 200710140785.2 dated Feb. 12, 2010.
Japanese Notice of Reasons for Rejection, with English translation thereof, issued in Japanese Patent Application No. 2006-226241, dated May 11, 2010.

* cited by examiner

*Primary Examiner* — Paul Huber
(74) *Attorney, Agent, or Firm* — McDermott Will & Emery LLP (57) ABSTRACT

A complex optical element includes a first optical portion and a second optical portion which are made of materials different from each other. The second optical portion is bonded to an optical functional face of the first optical portion. A concav-oconvex face part is formed at the central part of the bond area between the first optical portion and the second optical portion.

4 Claims, 9 Drawing Sheets

Spherical aberration (mm)

FIG. 8

Sine condition (mm)

Spherical aberration (mm)

FIG. 11

Sine condition (mm)

−0.5000   −0.2500   0.0000   0.2500   0.5000
Spherical aberration (mm)

FIG.14

−0.500   −0.250   0.000   0.250   0.500
Sine condition (mm)

Spherical aberration (mm)

FIG.17

Sine condition (mm)

-0.5000  -0.2500   0.0000   0.2500   0.5000
Spherical aberration (mm)

FIG.20

-0.500   -0.250   0.000   0.250   0.500
Sine condition (mm)

Spherical aberration (mm)

FIG.23

Sine condition (mm)

COMPLEX OPTICAL ELEMENT AND OPTICAL PICKUP

CROSS REFERENCE TO RELATED APPLICATIONS

This Non-provisional application claims priority under 35 U.S.C. §119(a) on Patent Application No. 2006-226241 filed in Japan on Aug. 23, 2006, and U.S. Provisional Application No. 60/878,403 filed on Jan. 4, 2007, the entire contents of which are hereby incorporated by reference.

FIELD OF THE INVENTION

The present invention relates to complex optical elements and optical pickups.

BACKGROUND ART

Recently, research and development are progressing on information recording media (optical disc, such as a BD (Blu-ray Disc (registered trademark), for example) including a plurality of information recording faces. With a plurality of information recording faces, however, distances from the surface on a light source side of the information recording medium to respective information recording faces thereof are different from each other, and therefore, focusing of laser lights on the respective information recording faces through a single objective lens causes spherical aberration due to the difference in distance from the light source side surface to the respective information recording faces of the information recording medium. This makes it difficult to focus the laser lights appropriately on the information recording faces.

In view of the above problem, for example, Japanese Patent Application Laid Open Publication No. 2006-31901 discloses that the angle of divergence of a light incident to the objective lens is changed by driving a beam expander lens, a collimator lens, or the like in the direction of the optical axis to correct the spherical aberration caused due to the difference in distance from the light source side surface to the respective information recording faces of the information recording medium.

SUMMARY OF THE INVENTION

Mere movement of the collimator lens or the like in the direction of the optical axis may correct the spherical aberration insufficiently. Particularly, in a case with three or more, for example, four information recording faces, it is difficult to correct the aberration sufficiently with respect to each of the information recording faces.

The present invention has been made in view of the foregoing and has its object of providing a complex optical element and an optical pickup which are capable of appropriately focusing laser lights to a plurality of information recording faces provided in an information recording medium.

A complex optical element in accordance with the present invention includes: a first optical portion; and a second optical portion, which are made of materials different from each other, the first optical portion including an optical functional face to which the second optical portion is bonded, wherein a first diffraction face is formed in a region of a bond area between the first optical portion and the second optical portion.

An optical pickup in accordance with the present invention is provided for focusing laser lights onto a plurality of information recording faces provided in parallel with each other in an information recording medium, which includes: a light source which emits the laser lights; an objective lens for focusing the laser lights onto the information recording faces; and an aberration correction element located at a standard point between the light source and the objective lens, being movable on an optical axis from the standard point, and changing a shape of a laser light to be incident to the objective lens by moving on the optical axis from the standard point so that the laser light is focused onto a target information recording face out of the plurality of information recording faces, wherein the objective lens is formed of a complex optical element composed of a first optical portion and a second optical portion which are made of materials different from each other, and the first optical portion includes an optical functional face to which the second optical portion is banded, and is formed of a diffraction face in a region of a bond area between the first optical portion and the second optical section.

As described above, according to the present invention, the complex optical element and the optical pickup can be provided which are capable of appropriately focusing the laser lights to the plurality of information recording faces provided in the information recording medium.

DESCRIPTION OF THE PREFERRED EMBODIMENTS

Embodiments of the present invention will be described below with reference to the accompanying drawings. It should be noted that the following preferred embodiments are mere examples and are not intended to limit the scope, applicable subjects, and uses of the present invention.

Embodiment 1

Figure 1:
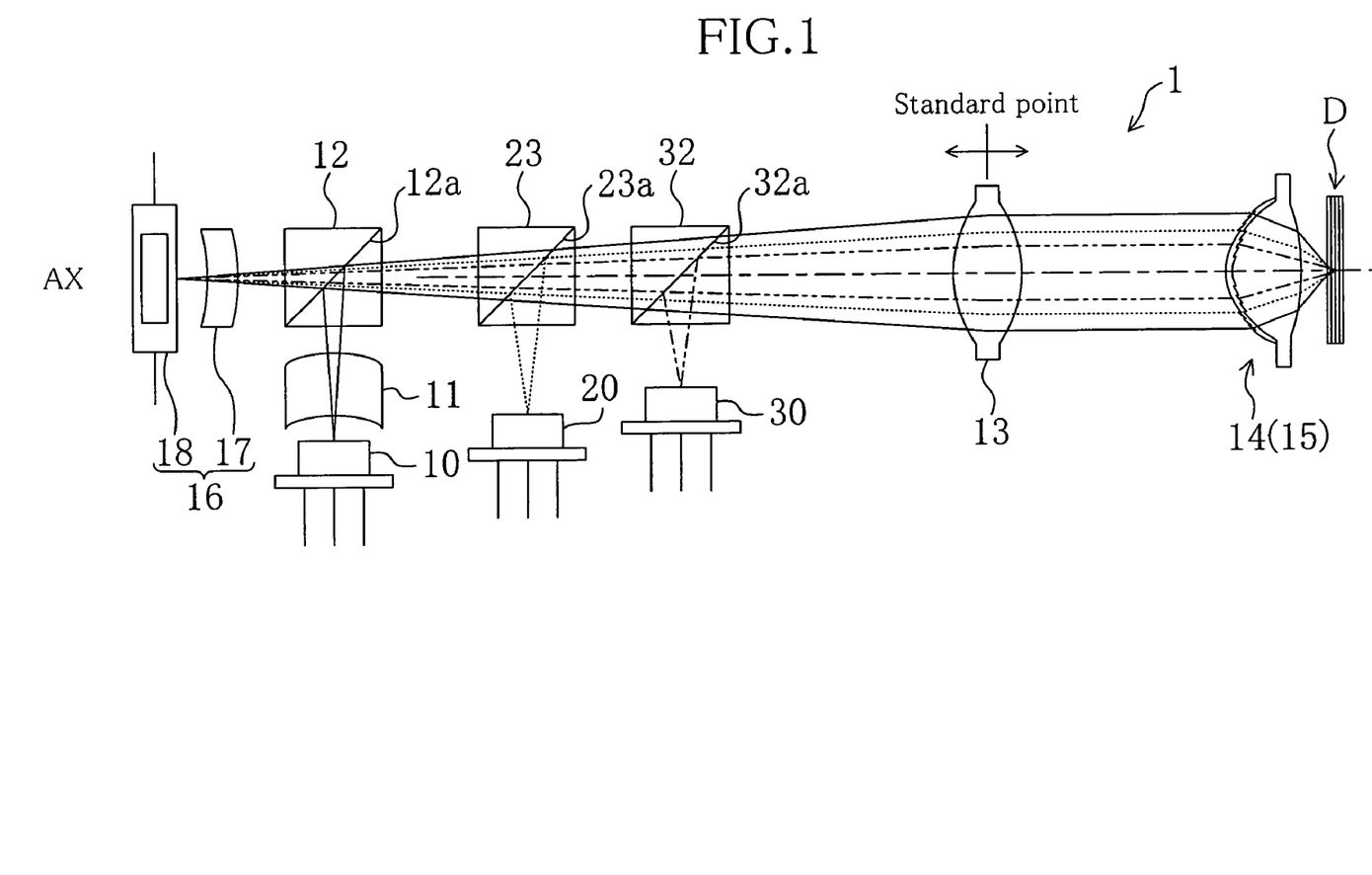
FIG. 1 is an illustration showing a construction of a main part of an optical pickup in accordance with one embodiment of the present invention.
Figure 2:
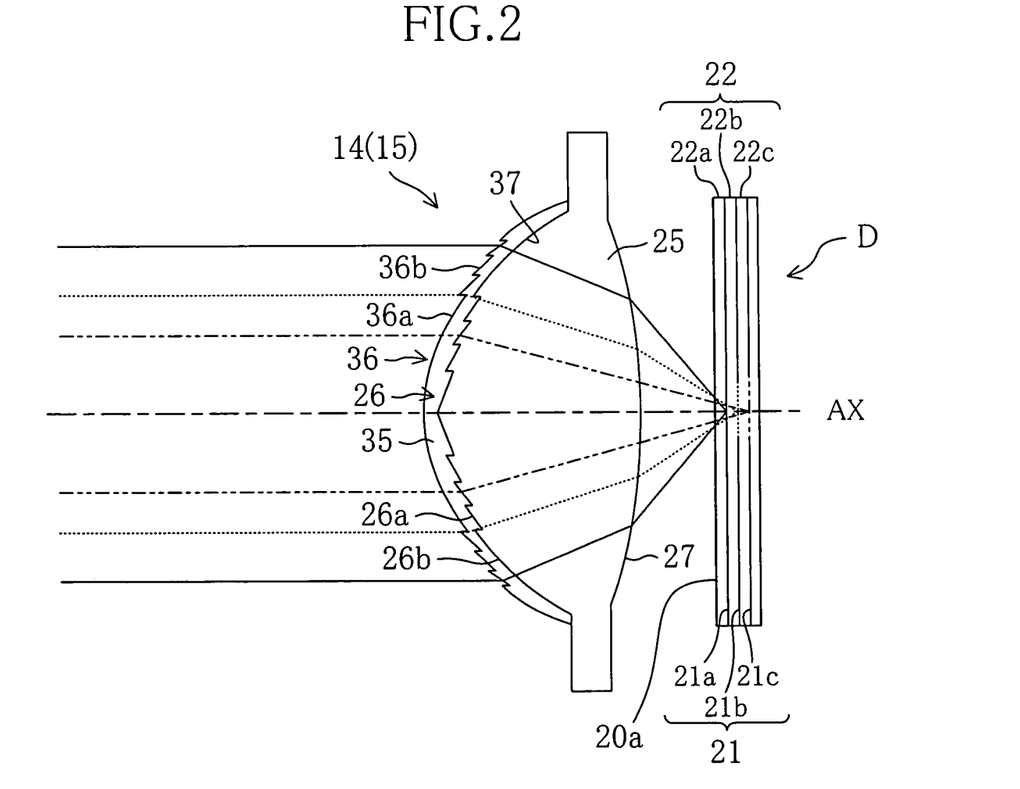
FIG. 2 is a sectional view in an enlarged scale of the vicinity of an objective optical system.

FIG. 1 is an illustration showing a construction of a main part of an optical pickup 1 in accordance with Embodiment 1. FIG. 2 is a sectional view in an enlarged scale showing the vicinity of an objective lens 14.

The optical pickup 1 in accordance with Embodiment 1 focuses laser lights onto information recording faces 21 of an information recoding medium D. The information recoding medium D is provided with a plurality of information recording faces 21 spaced apart from and in parallel with each other, and the optical pickup 1 focuses the respective laser lights onto the respective plurality of information recording faces 21.

Specifically, the information recording medium D is provided with three information recording faces 21 of a first information recording face 21a responsive to a light having a wavelength of $\lambda 1$, a second information recoding face 21b responsive to a light having a wavelength of $\lambda 2$ ($\lambda 1 < \lambda 2$), and a third information recoding face 21c responsive to a light having a wavelength of $\lambda 3$ ($\lambda 2 < \lambda 3$), which are arranged in this order from the light source 10 side. A first protection layer 22a having a protection substrate thickness of t1 is provided on the light source 10 side of the first information recording face 21a. A second protection layer 22b having a protection substrate thickness of t2 (t1<t2) is provided between the first information recording face 21a and the second information recording face 21b. A third protection layer 22c having a protection substrate thickness of t3 (t2<t3) is provided between the second information recording face 21b and the third information recording face 21c. The first protection layer 22a, the second protection layer 22b, and the third protection layer 22c may have the same protection substrate thickness or protection substrate thicknesses different from each other.

Though the present embodiment refers to the case with three information recording faces 21a, 21b, 21c as an example, the present invention is not limited thereto. The pickup in accordance with the present invention may focus laser lights onto two, three, five, or more recording information faces provided in an information recording medium.

As well, the kind of the information recording medium D is not limited specifically. The information recording medium D may be any optical disc, such as a CD (Compact Disc), a DC-R (Compact Disc Recordable), a CD-RW (Compact Disc ReWritable), a CD-ROM (Compact Disc Read Only Memory), a DVD (Digital Versatile Disc), a DVD-R (Digital Versatile Disc Recordable), a DVD-RW (Digital Versatile Disc ReWritable), a DVD-ROM (Digital Versatile Disc Read Only Memory), a DVD-RAM (Digital Versatile a Disc Random Access Memory), an EVD (Enhanced Versatile Disc), an EVD-R (Enhanced Versatile Disc Recordable), an EVD-RW (Enhanced Versatile Disc ReWritable), an EVD-ROM (Enhanced Versatile Disc Read Only Memory), an EVD-RAM (Enhanced Versatile Disc Random Access Memory), a BD (Blu-ray Disc), a BD-R (Blu-ray Disc Recordable), a BD-RW (Blu-ray Disc ReWritable), a BD-ROM (Blu-ray Disc Read Only Memory), a BD-RAM (Blu-ray Disc Random Access Memory), a HD-DVD (High Definition Digital Versatile Disc), a HD-DVD-R (High Definition Digital Versatile Disc Recordable), a HD-DVD-RW (High Definition Digital Versatile Disc ReWritable), a HD-DVD-ROM (High Definition Digital Versatile Read Only Memory), a HD-DVD-RAM (High Definition Digital Versatile Disc Random Access memory), or the like, all of which are registered trademarks.

The optical pickup 1 includes three light sources 10, 20, 30, a beam shaping lens 11, three beam splitters 12, 23, 32 respectively corresponding to the three light sources 10, 20, 30, a collimator lens 13, an objective optical system 14, and a detection system 16.

The light source 10 emits a laser light (diverging ray) having a wavelength of 378 to 438 nm, which may be below 420 nm, for a BD (registered trademark) as the information recording medium D.

The light source 20 emits a laser light having a wavelength of 630 to 690 nm for a DVD (registered trademark) as the information recording medium D.

The light source 30 emits a laser light having a wavelength of 750 to 810 nm for a CD (registered trademark) as the information recording medium D.

The beam shaping lens 11 is arranged before the light source 10 to shape the laser light emitted from the light source 10 into a desired form. The laser light shaped by the beam shaping lens 11 is reflected by a reflection face 12a of the beam splitter 12 toward the information recording medium D.

The beam splitter 23 is arranged before the light source 20. The laser light emitted from the light source 20 is reflected by a reflection face 23a of the beam splitter 23 toward the information recording medium D.

The beam splitter 32 is arranged before the light source 30. The laser light emitted from the light source 30 is reflected by a reflection face 32a of the beam splitter 32 toward the information recording medium D.

The collimator lens 13, which may be composed of a single lens or a set of plurality of lenses, and an objective optical system 14 for focusing the laser lights onto the information recording faces 21a, 21b, 21c of the information recording medium D are arranged between the beam splitter 23 and the information recording medium D.

It is noted that the objective optical system 14 is composed of only a complex optical element 15 in Embodiment 1, but may be composed of the complex optical element 15 and one or more other optical elements, such as a phase correction element, a beam expander lens, or the like.

The NA of the complex optical element 15 is not limited specifically and is preferably 0.8, for example, when the optical pickup 1 focuses the laser light onto a BD (trademark) or the like.

The laser lights focused on the information recording faces 21 of the information recording medium D through the objective lens 14 is reflected by the information recording faces 21. Then, the lights reflected by the information recording faces 21 pass through the objective optical system 14, the collimator lens 13 (aberration correction element), the beam splitters 12, 23, 34 and are then incident to the detection system 16.

The detection system 16 is composed of a detector 18 and a detection lens 17 for focusing the reflected lights onto the detector 18 so that the reflected lights focused by the detection lens 17 is detected in the detector 18.

Though only one detector 18 is provided in Embodiment 1, three exclusive detectors corresponding to the respective wavelengths may be provided.

In Embodiment 1, the collimator lens 13 functions as an aberration correction element, is arranged at a standard point between the beam splitter 32 and the complex optical element 15 (the objective optical system 14), and is movable on the optical axis AX from the standard point. The collimator lens 13 moves on the optical axis AX from the standard point to cause a laser light to be focused appropriately onto a target information recording face out of the plurality of information recording faces 21 through the complex optical element 15 (the objective optical system 14). In other words, the position of the collimator lens 13 as an aberration correction element is adjusted according to the position on the optical axis AX of a target information recording face onto which a laser light is to be focused so that the laser lights are focused on the information recording faces 21a, 21b, 21c appropriately.

Specifically, suppose that the case, for example, where the complex optical element 15 is so designed optically that a laser light is focused appropriately onto the first information recording face 21a through the objective optical system 14 when the collimator lens 13 is located at the standard point. In order to focus a laser light onto an information recording face other than the first information recording face 21a, for example, the second information recording face 21b, the position on the optical axis AX of the collimator lens 13 is adjusted to adjust the shape (angle of divergence or the like) of a laser light so that the laser light is focused onto the second information recording face 21b through the objective optical system. Thus, the optical pickup 1 of the present embodiment can focus laser lights appropriately onto the plural information recording faces 21 provided in the information recording medium D.

Further, in the present embodiment, the complex optical element 15 composing the objective optical system 14 includes a first optical portion 25 and a second optical portion 35. The first optical portion 25 is composed of a biconvex lens including an optical functional face (lens face) 26 and an optical functional face (lens face) 27 which are both convex and aspheric.

The optical functional face 26 includes a concavoconvex face part 26a (a first diffraction face) formed at the central part thereof and a smooth face part 26b formed adjacently to the concavoconvex face part 26a. In Embodiment 1, the concavoconvex part 26a is formed of a diffraction face in a serrate form in section.

It is noted that the "smooth face" in the present specification means a smooth face with no steps and ridge lines. In contrast, the "concavoconvex face" means a face in which concave parts and convex parts are formed periodically or non-periodically. In the concavoconvex face, the boundaries between the concave parts and the convex parts may not be ridged and may be in a chamfered rounded form.

The second optical portion 35 is composed of a meniscus lens bonded to the optical functional face 26 of the first optical portion 25. An optical functional face 37 on the first optical portion 25 side of the second optical portion 35 is in a form corresponding to the optical functional face 26, namely, is formed of a diffraction face region formed at the central part thereof and a smooth face region adjacent to the diffraction face.

Referring to an optical functional face 36 on the opposite side of the second optical portion 35 to the optical functional face 26, it includes a smooth face part 36a formed at the central part thereof and a concavoconvex part 36b formed at the peripheral part of the smooth face part 36a, specifically, at least a part of a region adjacent to the smooth face part 36a and not overlapping with the concavoconvex part 26a in the direction of the optical axis. The concavoconvex part 36b is formed of a diffraction face in a serrate form in section.

Thus, the complex optical element 15 of the present embodiment includes three first to third faces. Specifically, from the light source 10 side in this order, there are included the first face (incident face), the second face (bonded face), and the third face (outgoing face). The first face includes two regions of an aspheric region from the center to a part having a NA of 0.6 and a region in a diffraction structure from the part having a NA of 0.6 to a part having a NA of 0.85. The second face includes two regions of a region in a diffraction structure from the center to a part having a NA of 0.6 and an aspheric region from the part having a NA of 0.6 to a part having a NA of 0.85. The third face includes one aspheric region.

In the present embodiment, the optical functional face 26 of the first optical portion 25 includes the concavoconvex face part 26a and the smooth face part 26b, as described above, so that the optical power of the optical functional face 26 in the central region where the concavoconvex face part 26a is formed is different from that in the peripheral region where the smooth face part 26b is formed.

As well, the optical functional face 36 of the second optical portion 35 includes the smooth face part 36a and the concavoconvex face part 36b, so that the optical power of the optical functional face 36 in the central region where the smooth face part 36a is formed is different from that in the peripheral region where the concavoconvex face part 36b is formed.

Hence, a light having a given wavelength can be condensed through the central regions, and a light having a different wavelength can be condensed through the peripheral regions.

Specifically, with the above complex optical element 15 provided, the light having a wavelength of approximately 655 nm can be condensed onto the information recording face of a DVD through the central region of the complex optical element 15, and the light having a wavelength of approximately 405 nm can be condensed as well onto the information recording face of a BD through the central region and the peripheral region thereof. Thus, the optical pickup exhibits compatibility with plural kinds of information recording media (for example, an optical disc). It is noted that the respective concavoconvex face parts 26a, 36b may be formed of a plurality of diffraction faces having different optical powers while the respective smooth face parts 26b, 36a may be formed of regions having different optical powers.

The optical pickup 1 can focus the laser lights for only one kind of information recording medium herein, but may have a structure capable of focusing laser lights for a plural kinds of information recording media. In this case, the objective optical system 14 may be composed of the complex optical element 15 and a phase correction element for correcting the phases of lights incident to the complex optical element 15, a beam expander lens, or the like.

Further, the collimator lens 13 is used as an aberration correction element herein, but the aberration correction element may be a sole beam expander lens arranged between a separate collimator lens and the complex optical element 15 or a combination of a beam expander lens and a collimator lens. Alternatively, a liquid crystal lens, a liquid lens, or the like may be employed as the aberration correction element.

In Embodiment 1, the lenses of the optical elements may include only a diffraction face substantially having refractivity, but may include another optical functional face, such as a refraction face, a phase stepped face, or the like. The materials of the lenses and the like of the optical elements are not limited and may be glass, resin, or the like, for example.

The optical pickup 1 may include any additional element that involves no substantial influence on transmitted wave aberration between the light sources 10, 20, 30 and the information recording medium D.

Moreover, the optical pickup 1 is provided with the three light sources 10, 20, 30 to focus the laser lights for three kinds of optical discs of a CD, a DVD, and a BD in Embodiment 1, but the present invention is not limited thereto. Only one light source may be provided which selectively emits a light having a wavelength responsive to any optical disc set in the optical pickup 1.

In addition, the present invention refers to the case where the smooth face parts are aspheric while the concavoconvex face parts are formed of diffraction faces in serrate forms in section. In the present invention, however, any the smooth face parts may be plane, spherical, cylindrical, oval, or toric, for example while any of the concavoconvex face parts may be a diffraction face in a rectangular from in section or in sinusoidal form in section, a lens array face of a plurality of convex lenses or concave lenses, a phase stepped face, or an anti-reflection face in an antireflective structure (structure formed of a plurality of conical projections or conical concaves arranged at a pitch smaller than the wavelength of a light to be prevented from reflection).

Embodiment 2

Figure 3:
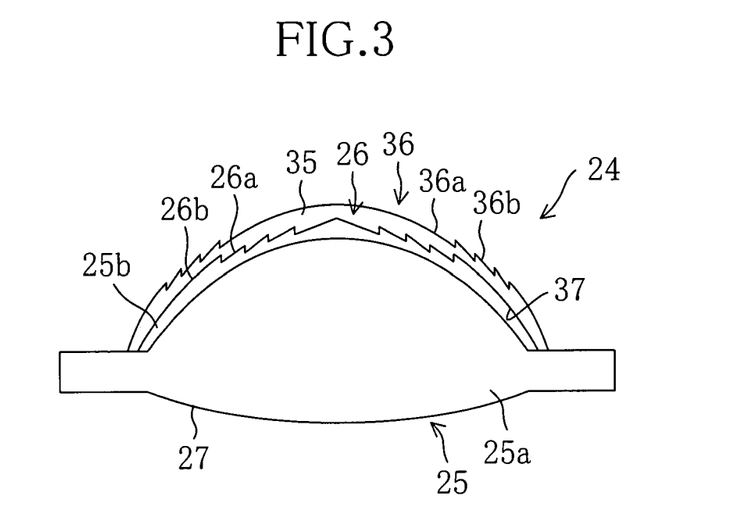
FIG. 3 is a sectional view showing a structure of a complex optical element in accordance with Embodiment 2.

FIG. 3 is a sectional view showing a structure of a complex optical element used in an optical pickup in accordance with Embodiment 2. Difference from Embodiment 1 lies in only that a coating layer of resin or the like excellent in processability is provided on the surface of the first optical portion and a diffraction face is formed at the coating layer to serve as the optical functional face. Therefore, the same reference numerals are assigned to the same elements in Embodiment 1, and only the difference will be described.

As shown in FIG. 3, a complex optical element 24 of Embodiment 2 includes a first optical portion 25 and a second optical portion 35. The first optical portion 25 includes a base lens 25a made of a grass material and a coating layer 25b bonded to one surface of the base lens 25a.

The base lens 25a is composed of a biconvex lens including a convex aspheric optical functional face (lens face) 26 and a convex aspheric optical functional face (lens face) 27. The coating layer 25b is made of a resin material and bonded to the optical functional face 26 of the base lens 25a.

The optical functional face 26 includes a concavoconvex face part 26a at the central part thereof and a smooth face parts 26b adjacent to the concavoconvex face part 26a. The concavoconvex face part 26a is formed of a diffraction face in a serrate form in section.

The second optical portion 35 is composed of a meniscus lens bonded to the optical functional face 26 of the first optical portion 25. An optical functional face 37 of the second optical portion 35 on the first optical portion 25 side is formed correspondingly to the optical functional face 26, namely, is formed of a diffraction face part at the central part thereof and a smooth face part adjacent to the diffraction face part.

Referring to an optical functional face 36 on the opposite side of the second optical portion 35 to the optical functional face 26, it includes a smooth face part 36a at the central part thereof and a concavoconvex part 36b at the peripheral part of the smooth face part 36a, specifically, at least a part of a region adjacent to the smooth face part 36a and not overlapping with the concavoconvex part 26a in the direction of the optical axis. The concavoconvex part 36b is formed of a diffraction face in a serrate form in section.

Thus, the complex optical element 24 of the present embodiment includes four first to fourth faces. Specifically, from the light source 10 side in this order, there are included the first face (incident face), the second face (bonded face), the third face (bonded face), and a fourth face (outgoing face). The first face includes two regions of an aspheric region from the center to a part having a NA of 0.6 and a region in a diffraction structure from the part having a NA of 0.6 to a part having a NA of 0.85. The second face includes two regions of a region in a diffraction structure from the center to a part having a NA of 0.6 and an aspheric region from the part having a NA of 0.6 to a part having a NA of 0.85. The third face includes two regions of an aspheric region from the center to a part having a NA of 0.6 and a different aspheric region from the part having a NA of 0.6 to a part having a NA of 0.85. The fourth face includes one aspheric region.

As described above, in the complex optical element 24 of Embodiment 2, the coating layer 5b made of a resin material is provided on the surface of the base lens 25a of the first optical portion 25, so that a material having high refractive index can be used for the base lens 25a. Accordingly, in a case with a lens having high NA, the angle of inclination of the lens face can be minimized, which is advantageous in production. Further, the coating layer 25b is made of a resin material, so that the diffraction face of the optical functional face 26 can be formed easily and accurately.

The first optical portion 25 is composed of a combination of a glass material and a resin material bonded thereto in Embodiment 2, but the present invention is not limited thereto. The first optical portion 25 may be composed of a combination of glass materials only or resin materials only.

Other Embodiments

Figure 4:
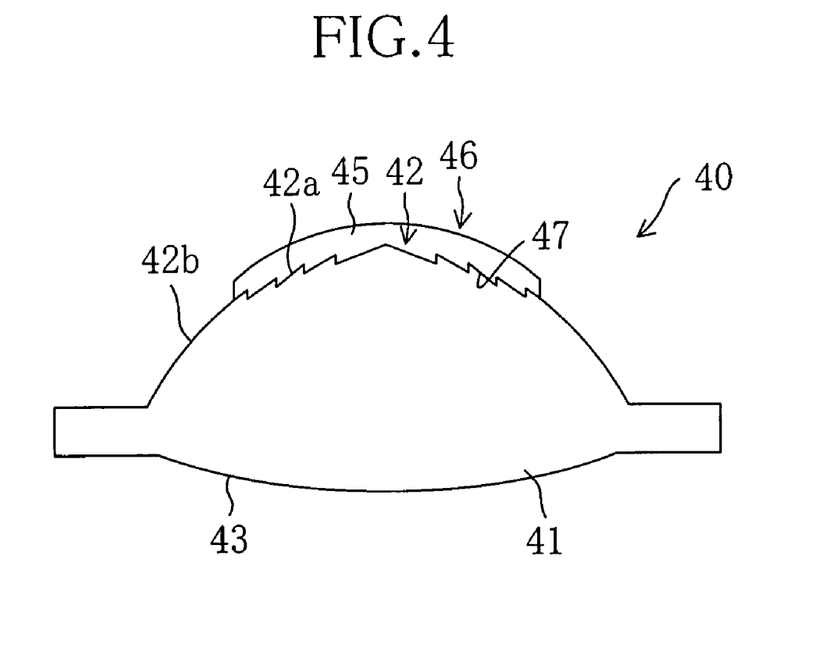
FIG. 4 is a sectional view showing a structure of another complex optical element.

FIG. 4 is a sectional view showing a structure of another complex optical element used in an optical pickup. As shown in FIG. 4, a complex optical element 40 includes a first optical portion 41 and a second optical portion 45. The first optical portion 41 is composed of a biconvex lens including a convex aspheric optical functional face (lens face) 42 and a convex aspheric optical functional face (lens face) 43.

The optical functional face 42 includes a concavoconvex face part 42a at the central part thereof and a smooth face part 42b adjacent to the concavoconvex face part 42a. The concavoconvex face part 42a is formed of a diffraction face in a serrate form in section.

The second optical portion 45 is composed of a meniscus lens bonded to the first optical portion 41 so as to cover only a region of the optical functional face 42 where the concavoconvex face part 42a is formed.

An optical functional face 47 of the second optical portion 45 on the first optical portion 41 side is formed correspondingly to the optical functional face 42, namely, is formed of a diffraction face. On the other hand, an optical functional face 46 on the opposite side of the second optical portion 45 to the optical functional face 42 is formed into a convex aspheric form.

Figure 5:
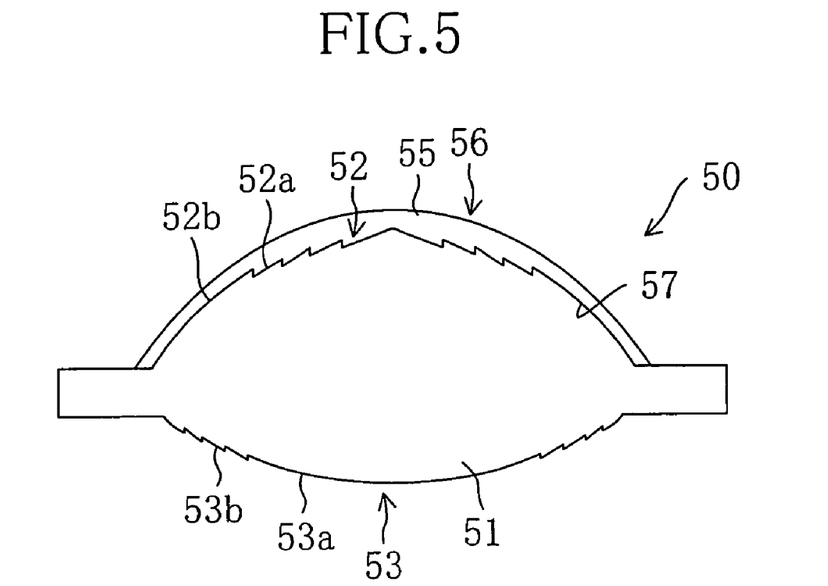
FIG. 5 is a sectional view showing a structure of still another complex optical element.

FIG. 5 is a sectional view showing a structure of still another complex optical element used in an optical pickup. As shown in FIG. 5, a complex optical element 50 includes a first optical portion 51 and a second optical portion 55. The first optical portion 51 is composed of a biconvex lens including a convex aspheric optical functional face (lens face) 52 and a convex aspheric optical functional face (lens face) 53.

The optical functional face 52 includes a concavoconvex face part 52a (first diffraction face) at the central part thereof and a smooth face part 52b adjacent to the concavoconvex face part 52a. The concavoconvex face part 52a is formed of a diffraction face in a serrate form in section.

The optical functional face 53 includes a smooth face part 53a at the central part thereof and a concavoconvex face part 53b at the peripheral part of the smooth face part 53a, specifically, at least a part of a region adjacent to the smooth face part 53a and not overlapping with the concavoconvex part 52a in the direction of the optical axis. The concavoconvex part 53b is formed of a diffraction face in a serrate form in section.

The second optical portion 55 is composed of a meniscus lens bonded to the optical functional face 52 of the first optical portion 51. An optical functional face 57 of the second optical portion 55 on the first optical portion 51 side is formed correspondingly to the optical functional face 52, namely, includes a diffraction face part at the central part thereof and a smooth face part adjacent to the diffraction face part. On the other hand, an optical functional face 56 on the opposite side of the second optical portion 55 to the optical functional face 52 is formed into a convex aspheric form.

EXAMPLES

Further detailed description will be given below to the optical pickup 1 of the present invention by referring to construction data, aberration figures, and the like. In each numeral example, each faces having an aspheric coefficient means an aspheric dioptric face or a face having a refractive function equivalent to that of an aspheric surface (a diffraction face or the like, for example) and is defined by the following conditional expression (*) that expresses a contour of an aspheric surface.

Expression $$X = \frac{C_j h^2}{1 + \sqrt{1 - (1 + k_j) C_j^2 h^2}} + \sum A_{j,n} h^n \quad (*)$$

Wherein: X is a distance from the contact plane of the vertex of an aspheric surface to a point on the aspheric surface at a height h from the optical axis; h is a height from the optical axis; $C_j$ is a curvature at the vertex of an aspheric surface of a j-th plane of a lens ($C_j=1/R_j$); $K_j$ is a conic constant of a j-th plane of a lens; and $A_{j,n}$ is an nth-order aspheric constant of a j-th plane of a lens.

Numeral Example 1

Construction data in Numeral Example 1 where the complex optical element 15 of Embodiment 1 is used is indicated in Tables 1 to 4.

TABLE 1

|  | BD | DVD | CD |
| --- | --- | --- | --- |
| Wavelength (nm) | 405 | 658 | 785 |
| Aperture diameter (mm) | 3.9 | 2.8 | 2.3 |
| NA | 0.85 | 0.6 | 0.47 |
| Working distance (WD) (mm) | 0.9 | 0.67 | 0.37 |
| Disc thickness (DT) (mm) | 0.0875 | 0.6 | 1.2 |

TABLE 2

| Face number (#) | Curvature radius of vertex (mm) | Thickness (mm) | Material | Remarks |
| --- | --- | --- | --- | --- |
| 0 | ∞ | D0 | Air |  |
| 1 | 1.5714796 | 0.01 | n1 | First region (aspheric face)/second region (diffraction face) |
| 2 | 1.5714796 | 2.33206 | n2 | First region (diffraction face)/ second region (aspheric face) |
| 3 | −9.611682 | WD | Air | Aspheric face |
| 4 | ∞ | DT | disc | Plane face |
| 5 | ∞ |  |  | Plane face |

TABLE 3

|  | BD | DVD | CD |
| --- | --- | --- | --- |
| D0 | ∞ | 100 | 40.688 |

TABLE 4

|  | BD | DVD | CD |
| --- | --- | --- | --- |
| Wavelength (nm) | 405 | 658 | 785 |
| n1 | 1.53279839 | 1.51298582 | 1.5093298 |
| n2 | 1.63059933 | 1.60981784 | 1.60585052 |
| disc | 1.61735665 | 1.5782857 | 1.57203127 |

Tables 5 to 11 indicate the aspheric coefficients of the complex optical element 15 in the order from the light source 10 side.

TABLE 5

| Aspheric coefficient of first face | First region (aspheric) |
| --- | --- |
| RD | 1.5713864 |
| CC | −0.86144913 |
| A4 | 0.011047961 |
| A6 | 0.000399102 |
| A8 | 0.00096609 |
| A10 | −0.001149775 |
| A12 | 0.000805537 |

TABLE 5-continued

| Aspheric coefficient of first face | First region (aspheric) |
|---|---|
| A14 | −0.000274527 |
| A16 | 3.78E−05 |

TABLE 6

| Aspheric coefficient of first face | Second region (aspheric) |
|---|---|
| RD | 1.8093459 |
| CC | −0.36610672 |
| A0 | 0.017060706 |
| A2 | 0 |
| A4 | 0.0092625 |
| A6 | −0.002792724 |
| A8 | 0.001376633 |
| A10 | −1.77E−05 |
| A12 | −5.84E−06 |
| A14 | 4.18E−06 |
| A16 | −1.25E−06 |

TABLE 7

| Phase function | |
|---|---|
| P2 | −108.41997 |
| P4 | −220.29454 |
| P6 | 96.784689 |
| P8 | −8.9213167 |
| P10 | 0.000000E+00 |
| P12 | 0.000000E+00 |
| P14 | 0.000000E+00 |
| P16 | 0.000000E+00 |

TABLE 8

| Aspheric coefficient of second face | First region |
|---|---|
| RD | 1.5713864 |
| CC | −0.86144913 |
| A4 | 0.011047961 |
| A6 | 0.000399102 |
| A8 | 0.00096609 |
| A10 | −0.001149775 |
| A12 | 0.000805537 |
| A14 | −0.000274527 |
| A16 | 3.78E−05 |

TABLE 9

| Phase function | |
|---|---|
| P2 | −50 |
| P4 | −11.720328 |
| P6 | −4.3279011 |
| P8 | −0.75108437 |

TABLE 10

| Aspheric coefficient of second face | Second region |
|---|---|
| RD | 1.8093459 |
| CC | −0.36610672 |
| A0 | 0.017060706 |

TABLE 10-continued

| Aspheric coefficient of second face | Second region |
|---|---|
| A4 | 0.0092625 |
| A6 | −0.002792724 |
| A8 | 0.001376633 |
| A10 | −1.77E−05 |
| A12 | −5.84E−06 |
| A14 | 4.18E−06 |
| A16 | −1.25E−06 |

TABLE 11

| Aspheric coefficient of third face | |
|---|---|
| RD | −9.61855 |
| CC | 0.00E+00 |
| A0 | 0.00E+00 |
| A4 | 0.034892146 |
| A6 | −0.000611552 |
| A8 | −0.003372395 |
| A10 | −0.000144149 |
| A12 | 0.00027057 |
| A14 | 0.000117548 |
| A16 | −1.42E−05 |
| A18 | −2.60E−05 |
| A20 | 5.73E−06 |

Figure 6:
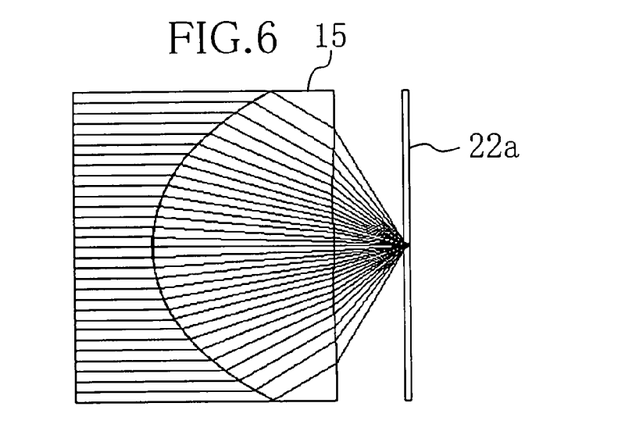
FIG. 6 is an illustration showing the optical paths in the vicinity of an objective lens of an optical pickup where a BD is set in Numerical Example 1.

FIG. 6 shows the optical paths in the vicinity of the complex optical element 15 of the optical pickup 1 where a BD is set in Numeral Example 1. In FIG. 6, for the BD, the wavelength is set to 405 mm, the protection substrate thickness is set to 0.0875 mm, the focal length is set to 2.3 mm, the effective diameter is set to 3.9 mm, and the NA is set to 0.85.

Figure 7:
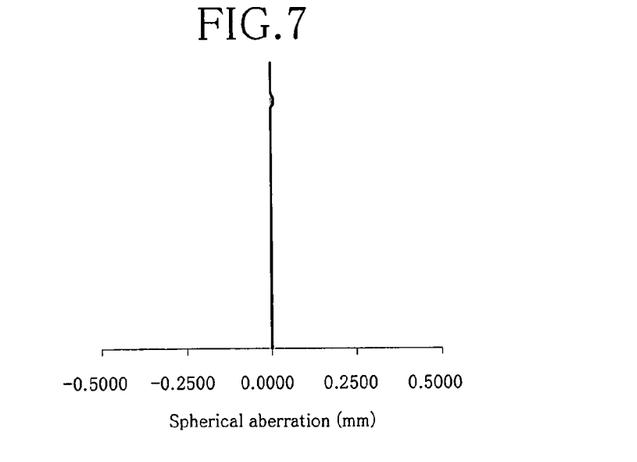
FIG. 7 is a graph showing the spherical aberration when parallel light is incident to the objective lens where the BD is set in Numerical Example 1.

FIG. 7 is a graph showing the spherical aberration when parallel light is incident to the complex optical element 15 (object distance is ∞ and magnification is ∞) where the BD is set in Numeral Example 1.

Figure 8:
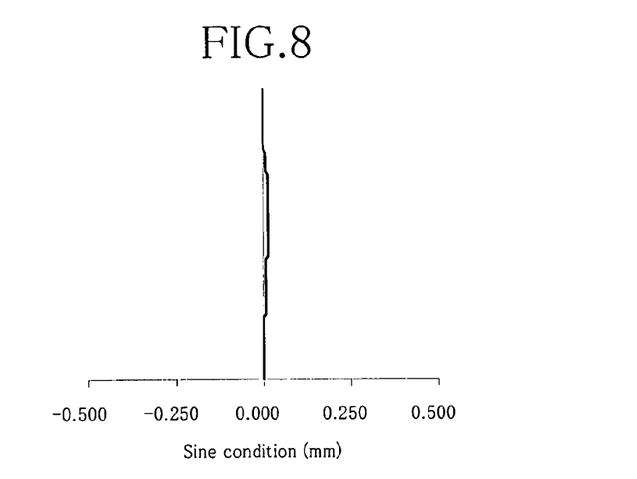
FIG. 8 is a graph showing the sine condition when parallel light is incident to the objective lens where the BD is set in Numerical Example 1.

FIG. 8 is a graph showing the sine condition when parallel light is incident to the complex optical element 15 (object distance is ∞ and magnification is ∞) where the BD is set in Numeral Example 1.

As can be understood from FIG. 7 and FIG. 8, the total aberration is 2.0 mλ, which means excellent performance exhibited.

Figure 9:
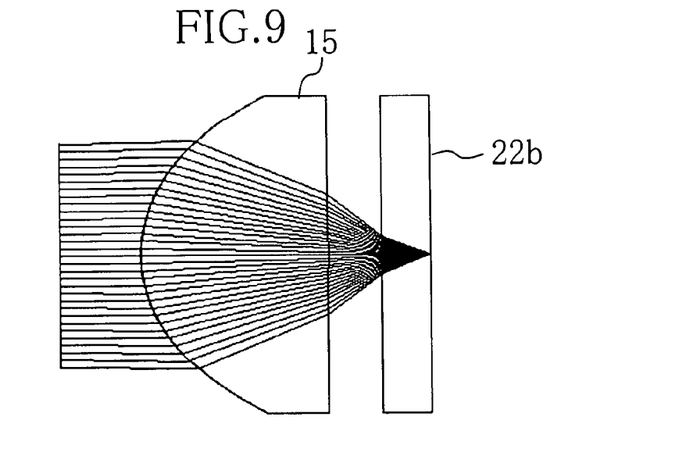
FIG. 9 is an illustration showing the optical paths in the vicinity of the objective lens of the optical pickup where a DVD is set in Numerical Example 1.

FIG. 9 shows the optical paths in the vicinity of the complex optical element 15 of the optical pickup 1 where a DVD is set in Numeral Example 1. In FIG. 9, for the DVD, the wavelength is set to 658 nm, the protection substrate thickness is set to 0.6 mm, the focal length is set to 2.4 mm, the effective diameter is set to 2.8 mm, and the NA is set to 0.6.

Figure 10:
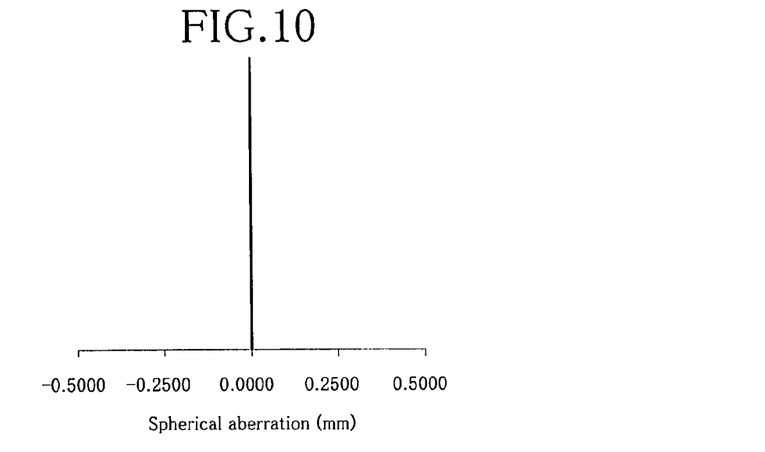
FIG. 10 is a graph showing the spherical aberration when parallel light is incident to the objective lens where the DVD is set in Numerical Example 1.

FIG. 10 is a graph showing the spherical aberration when parallel light is incident to the complex optical element 15 (object distance is ∞ and magnification is ∞) where the DVD is set in Numeral Example 1.

Figure 11:
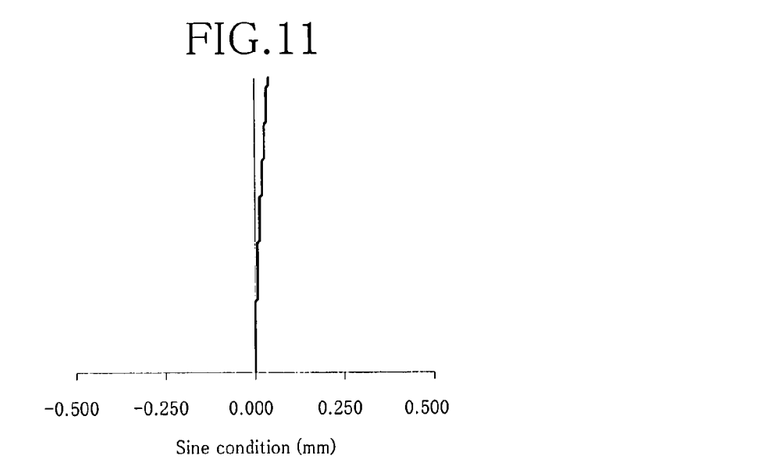
FIG. 11 is a graph showing the sine condition when parallel light is incident to the objective lens where the DVD is set in Numerical Example 1.

FIG. 11 is a graph showing the sine condition when parallel light is incident to the complex optical element 15 (object distance is ∞ and magnification is ∞) where the DVD is set in Numeral Example 1.

As can be understood from FIG. 10 and FIG. 11, the total aberration is 1.5 mλ, which means excellent performance exhibited.

Figure 12:
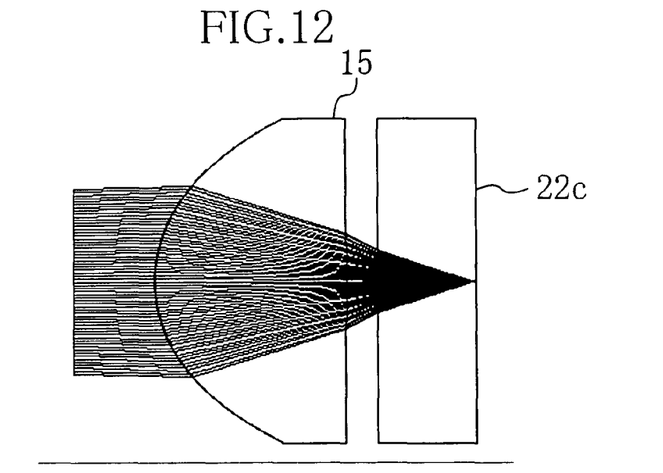
FIG. 12 is an illustration showing the optical paths in the vicinity of the objective lens of the optical pickup where a CD is set in Numerical Example 1.

FIG. 12 shows the optical paths in the vicinity of the complex optical element 15 of the optical pickup 1 where a CD is set in Numeral Example 1. In FIG. 12, for the DC, the wavelength is set to 785 nm, the protection substrate thickness is set to 1.2 mm, the focal length is set to 2.4 mm, the effective diameter is set to 2.2 mm, and the NA is set to 0.47.

Figure 13:
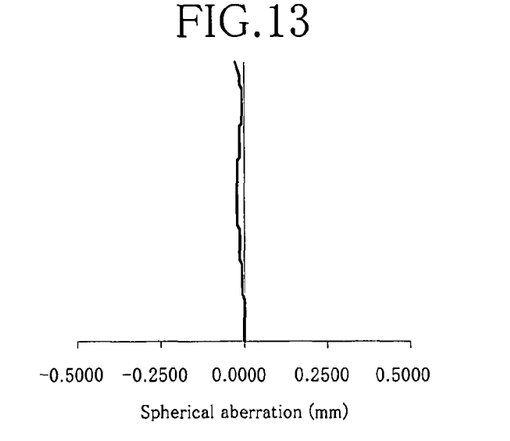
FIG. 13 is a graph showing the spherical aberration when parallel light is incident to the objective lens where the CD is set in Numerical Example 1.

FIG. 13 is a graph showing the spherical aberration when parallel light is incident to the complex optical element 15 (object distance is ∞ and magnification is ∞) where the CD is set in Numeral Example 1.

Figure 14:
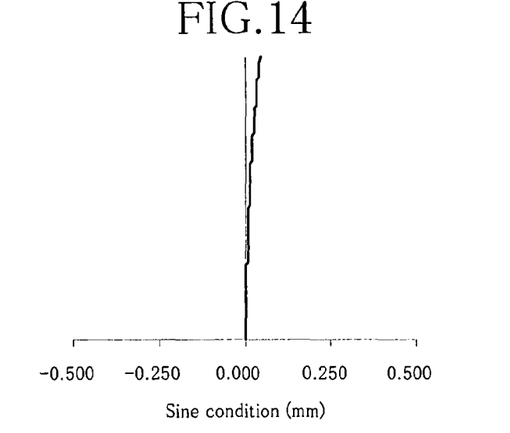
FIG. 14 is a graph showing the sine condition when parallel light is incident to the objective lens where the CD is set in Numerical Example 1.

FIG. 14 is a graph showing the sine condition when parallel light is incident to the complex optical element 15 (object distance is ∞ and magnification is ∞) where the CD is set in Numeral Example 1.

As can be understood from FIG. 13 and FIG. 14, the total aberration is 5.3 mλ, which means excellent performance exhibited.

Numeral Example 2

Construction data in Numeral Example 2 where the complex optical element 24 of Embodiment 2 is used is indicated in Tables 12 to 15.

TABLE 12

|  | BD | DVD | CD |
|---|---|---|---|
| Wavelength (nm) | 405 | 658 | 785 |
| Aperture diameter (mm) | 3.9 | 2.8 | 2.3 |
| NA | 0.85 | 0.6 | 0.47 |
| Working distance(WD) (mm) | 0.9 | 0.67 | 0.37 |
| Disc thickness(DT) (mm) | 0.0875 | 0.6 | 1.2 |

TABLE 13

| Face number (#) | Curvature radius of vertex (mm) | Thickness (mm) | Material | Remarks |
|---|---|---|---|---|
| 0 | ∞ | D0 | Air |  |
| 1 | 1.5748725 | 0.01 | n1 | First region (aspheric face)/second region (diffraction face) |
| 2 | 1.5748725 | 0.01 | n2 | First region (diffraction face)/second region (aspheric face) |
| 3 | 1.5748725 | 2.332104 | n3 | First region (aspheric face)/second region (aspheric phase) |
| 4 | −9.617259 | WD | Air | Aspheric face |
| 5 | ∞ | DT | disc | Plane face |
| 6 | ∞ |  |  | Plane face |

TABLE 14

|  | BD | DVD | CD |
|---|---|---|---|
| D0 | ∞ | 100 | 40.688 |

TABLE 15

|  | BD | DVD | CD |
|---|---|---|---|
| Wavelength (nm) | 405 | 658 | 785 |
| n1 | 1.53279839 | 1.51298582 | 1.5093298 |
| n2 | 1.60688949 | 1.58688936 | 1.58307121 |
| n3 | 1.63059933 | 1.60981784 | 1.60585052 |
| disc | 1.61735665 | 1.5782857 | 1.57203127 |

Tables 16 to 23 indicate the aspheric coefficients of the complex optical element 24 in the order from the light source 10 side.

TABLE 16

| Aspheric coefficient of first face | First region (aspheric) |
|---|---|
| RD | 1.5748725 |
| CC | −0.86726578 |
| A0 | 0 |
| A2 | 0 |
| A4 | 0.011061896 |
| A6 | 0.00040726 |
| A8 | 0.000956513 |
| A10 | −0.001150591 |
| A12 | 0.000806113 |
| A14 | −0.000274163 |
| A16 | 3.78E−05 |

TABLE 17

| Aspheric coefficient of first face | Second region (aspheric) |
|---|---|
| RD | 1.8099081 |
| CC | −0.36671528 |
| A0 | 0.016141605 |
| A2 | 0 |
| A4 | 0.009203811 |
| A6 | −0.002805081 |
| A8 | 0.001374226 |
| A10 | −1.81E−05 |
| A12 | −5.91E−06 |

TABLE 17-continued

| Aspheric coefficient of first face | Second region (aspheric) |
|---|---|
| A14 | 4.17E−06 |
| A16 | −1.25E−06 |

TABLE 18

| Aspheric coefficient of second face | First region |
|---|---|
| RD | 1.5748725 |
| CC | −0.86726578 |
| A0 | 0 |
| A2 | 0 |
| A4 | 0.011061896 |
| A6 | 0.00040726 |
| A8 | 0.000956513 |
| A10 | −0.001150591 |
| A12 | 0.000806113 |
| A14 | −0.000274163 |
| A16 | 3.78E−05 |

TABLE 19

| Phase function | |
|---|---|
| P2 | −50 |
| P4 | −11.74502 |
| P6 | −4.336294 |
| P8 | −0.82539707 |

TABLE 20

| Aspheric coefficient of second face | Second region |
|---|---|
| RD | 1.8099081 |
| CC | −0.36671528 |
| A0 | 0.016141605 |
| A2 | 0 |
| A4 | 0.009203811 |
| A6 | −0.002805081 |
| A8 | 0.001374226 |
| A10 | −1.81E−05 |
| A12 | −5.91E−06 |
| A14 | 4.17E−06 |
| A16 | −1.25E−06 |

TABLE 21

| Aspheric coefficient of third face | First region |
|---|---|
| RD | 1.5748725 |
| CC | −0.86726578 |
| A0 | 0 |
| A2 | 0 |
| A4 | 0.011061896 |
| A6 | 0.00040726 |
| A8 | 0.000956513 |
| A10 | −0.001150591 |
| A12 | 0.000806113 |
| A14 | −0.000274163 |
| A16 | 3.78E−05 |

TABLE 22

| Aspheric coefficient of third face | Second region |
|---|---|
| RD | 1.8099081 |
| CC | −0.36671528 |
| A0 | 0.016141605 |
| A2 | 0 |
| A4 | 0.009203811 |
| A6 | −0.002805081 |
| A8 | 0.001374226 |
| A10 | −1.81E−05 |
| A12 | −5.91E−06 |
| A14 | 4.17E−06 |
| A16 | −1.25E−06 |

TABLE 23

| Aspheric coefficient of fourth face | |
|---|---|
| RD | −9.617259 |
| CC | 0 |
| A0 | 0 |
| A2 | 0 |
| A4 | 0.034889687 |
| A6 | −0.000612041 |
| A8 | −0.003372138 |
| A10 | −0.000142367 |
| A12 | 0.000271598 |
| A14 | 0.000113184 |
| A16 | −1.41E−05 |
| A18 | −2.58E−05 |
| A20 | 5.85E−06 |

Figure 15:
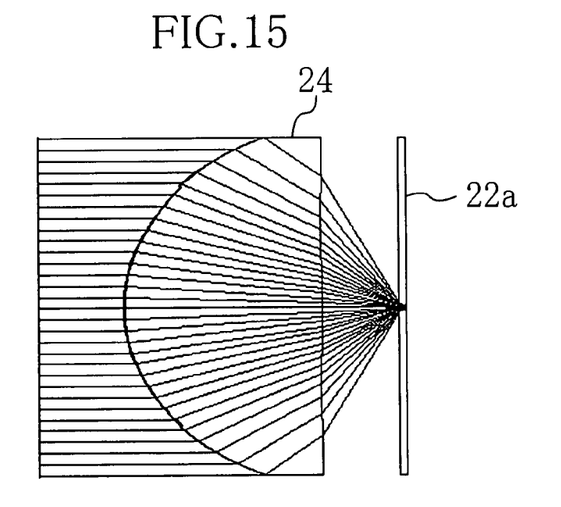
FIG. 15 is an illustration showing the optical paths in the vicinity of an objective lens of an optical pickup where a BD is set in Numerical Example 2.

FIG. 15 shows the optical paths in the vicinity of the complex optical element 24 of the optical pickup 1 where a BD is set in Numeral Example 2. In FIG. 15, for the BD, the wavelength is set to 405 nm, the protection substrate thickness is set to 0.0875 mm, the focal length is set to 2.3 mm, the effective diameter is set to 3.9 mm, and the NA is set to 0.85.

Figure 16:
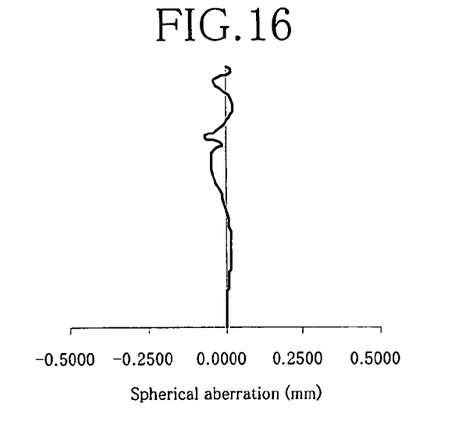
FIG. 16 is a graph showing the spherical aberration when parallel light is incident to the objective lens where the BD is set in Numerical Example 2.

FIG. 16 is a graph showing the spherical aberration when parallel light is incident to the complex optical element 24 (object distance is ∞ and magnification is ∞) where the BD is set in Numeral Example 2.

Figure 17:
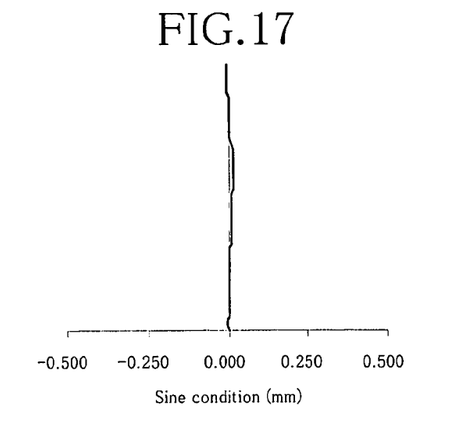
FIG. 17 is a graph showing the sine condition when parallel light is incident to the objective lens where the BD is set in Numerical Example 2.

FIG. 17 is a graph showing the sine condition when parallel light is incident to the complex optical element 24 (object distance is ∞ and magnification is ∞) where the BD is set in Numeral Example 2.

As can be understood from FIG. 16 and FIG. 17, the total aberration is 26.7 mλ, which means excellent performance exhibited.

Figure 18:
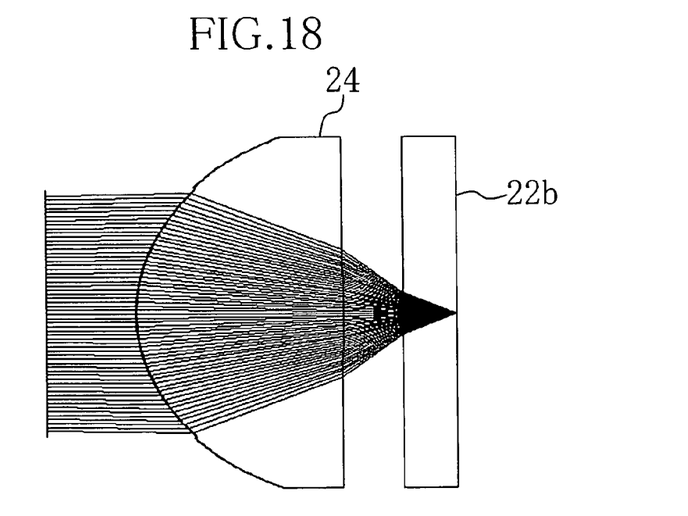
FIG. 18 is an illustration showing the optical paths in the vicinity of the objective lens of the optical pickup where a DVD is set in Numerical Example 2.

FIG. 18 shows the optical paths in the vicinity of the complex optical element 24 of the optical pickup 1 where a DVD is set in Numeral Example 2. In FIG. 18, for the DVD, the wavelength is set to 658 nm, the protection substrate thickness is set to 0.6 mm, the focal length is set to 2.4 mm, the effective diameter is set to 2.8 mm, and the NA is set to 0.6.

Figure 19:
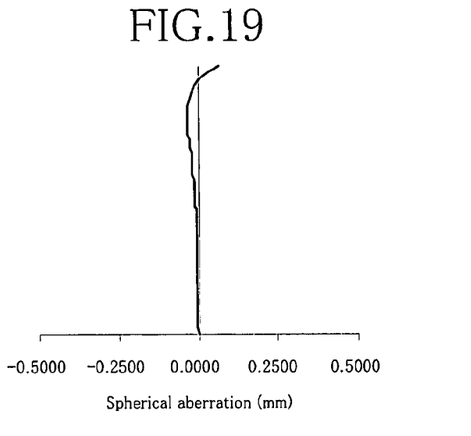
FIG. 19 is a graph showing the spherical aberration when parallel light is incident to the objective lens where the DVD is set in Numerical Example 2.

FIG. 19 is a graph showing the spherical aberration when parallel light is incident to the complex optical element 24 (object distance is ∞ and magnification is ∞) where the DVD is set in Numeral Example 2.

Figure 20:
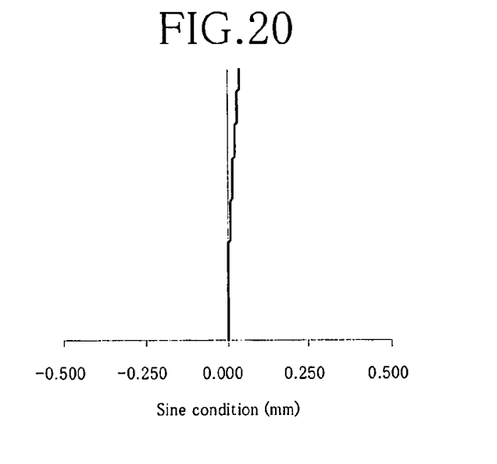
FIG. 20 is a graph showing the sine condition when parallel light is incident to the objective lens where the DVD is set in Numerical Example 2.

FIG. 20 is a graph showing the sine condition when parallel light is incident to the complex optical element 24 (object distance is ∞ and magnification is ∞) where the DVD is set in Numeral Example 2.

As can be understood from FIG. 19 and FIG. 20, the total aberration is 16.5 mλ, which means excellent performance exhibited.

Figure 21:
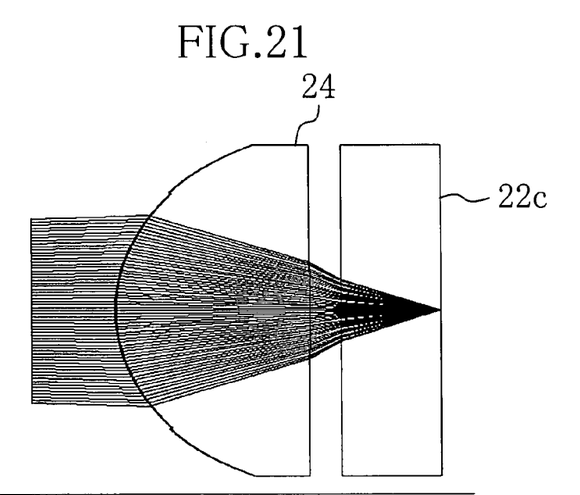
FIG. 21 is an illustration showing the optical paths in the vicinity of the objective lens of the optical pickup where a CD is set in Numerical Example 2.

FIG. 21 shows the optical paths in the vicinity of the complex optical element 24 of the optical pickup 1 where a CD is set in Numeral Example 2. In FIG. 21, for the DC, the wavelength is set to 785 nm, the protection substrate thickness is set to 1.2 mm, the focal length is set to 2.4 mm, the effective diameter is set to 2.2 mm, and the NA is set to 0.47.

Figure 22:
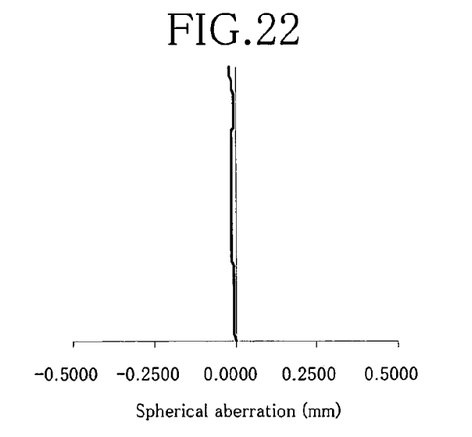
FIG. 22 is a graph showing the spherical aberration when parallel light is incident to the objective lens where the CD is set in Numerical Example 2.

FIG. 22 is a graph showing the spherical aberration when parallel light is incident to the complex optical element 24 (object distance is ∞ and magnification is ∞) where the CD is set in Numeral Example 2.

Figure 23:
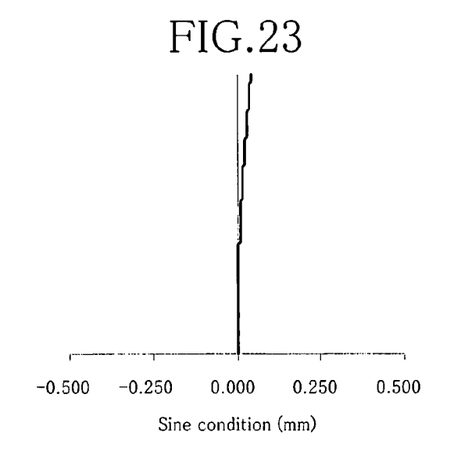
FIG. 23 is a graph showing the sine condition when parallel light is incident to the objective lens where the CD is set in Numerical Example 2.

FIG. 23 is a graph showing the sine condition when parallel light is incident to the complex optical element 24 (object distance is ∞ and magnification is ∞) in Numeral Example 2 in application to the CD.

As can be understood from FIG. 22 and FIG. 23, the total aberration is 3.6 mλ, which means excellent performance exhibited.

As described above, the present invention can achieve a highly practical effect that a complex optical element and an optical pickup are attained which are capable of appropriately focusing laser lights onto a plurality of information recording faces of an information recording medium, and therefore, has notably wide industrial applicability.

What is claimed is:

1. A complex optical element comprising:
a first optical portion; and
a second optical portion, wherein:
the first and second optical portions are made of materials different from each other,
the first optical portion includes an optical functional face to which the second optical portion is bonded,
the optical functional face in the first optical portion includes a first diffraction face formed at a central part of a region of a bonded surface between the first optical portion and the second optical portion, and a first smooth face formed adjacent to the first diffraction face,
the second optical portion includes an optical functional face opposite to the bonded surface between the first and second optical portions,
the optical functional face in the second optical portion includes a second smooth face formed at a central part thereof, and a second diffraction face formed adjacent to the second smooth face, and
the first diffraction face and the second diffraction face do not overlap in a direction of an optical axis.

2. The complex optical element of claim 1, which is used in an optical pickup for focusing laser lights onto information recording faces of a first information recording medium, a second information recording medium, and a third information recording medium, the first information recording medium having a protection substrate thickness of $t1$ and being responsive to a light having a wavelength of $\lambda 1$, the second information recording medium having a protection substrate thickness of $t2$ ($t1 \leq t2$) and being responsive to a light having a wavelength of $\lambda 2$ ($\lambda 1 < \lambda 2$), and a third information recording medium having a protection substrate thickness of $t3$ ($t2 < t3$) and being responsive to a light having a wavelength of $\lambda 2$ ($\lambda 2 < \lambda 3$).

3. A complex optical element comprising:
a first optical portion; and
a second optical portion, wherein:
the first and second optical portions are made of materials different from each other,
the first optical portion includes a first optical functional face on a first side of the first optical portion and a second optical functional face on a second side of the first optical portion, the second side being opposite to the first side,
the first optical functional face is bonded to the second optical portion at the first side and includes a first diffraction face formed at a central part thereof, and a first smooth face formed adjacent to the first diffraction face, and
the second optical functional face includes a second smooth face formed at a central part thereof, and a second diffraction face formed adjacent to the second smooth face,
wherein the first diffraction face and the second diffraction face do not overlap in a direction of an optical axis.

4. An optical pickup for focusing laser lights onto a plurality of information recording faces provided in parallel with each other in an information recording medium, comprising:
a light source which emits the laser lights;
an objective lens for focusing the laser lights onto the information recording faces; and
an aberration correction element located at a standard point between the light source and the objective lens, being movable on an optical axis from the standard point, and changing a shape of a laser light to be incident to the objective lens by moving on the optical axis from the standard point so that the laser light is focused onto a target information recording face out of the plurality of information recording faces, wherein:
the objective lens is formed of a complex optical element composed of a first optical portion and a second optical portion which are made of materials different from each other,
the first optical portion includes an optical functional face to which the second optical portion is bonded,
a first diffraction face is formed in a region of a bond area between the first optical portion and the second optical portion,
the second optical portion includes an optical functional face opposite to the bond area, and
a second diffraction face is formed at least a part of a region of the optical functional face of the second optical portion where the first diffraction face does not overlap in a direction of an optical axis.

* * * * *